United States Patent [19]

Dangschat et al.

[11] 4,277,797
[45] Jul. 7, 1981

[54] COLOR TELEVISION RECEIVER HAVING AN AUTOMATIC ADJUSTMENT SYSTEM AND A PROCESS FOR ADJUSTING THE RECEIVER

[75] Inventors: Rainer Dangschat, Landsham; Alfred Jeschke, Munich; Helmüt Leichtl, Mittenwald; Wolfgang Winkler, Egmating, all of Fed. Rep. of Germany

[73] Assignee: Siemens Aktiengesellschaft, Berlin & Munich, Fed. Rep. of Germany

[21] Appl. No.: 21,346

[22] Filed: Mar. 19, 1979

[51] Int. Cl.³ .................................. H04N 9/535
[52] U.S. Cl. .................................. 358/21 R
[58] Field of Search .............. 358/21, 29, 28, 39, 358/40, 64, 10, 160, 163

[56] References Cited

U.S. PATENT DOCUMENTS

| | | |
|---|---|---|
| 3,792,195 | 2/1974 | Wilson et al. |
| 3,877,068 | 4/1975 | Kosaka et al. ................ 358/29 |
| 3,962,722 | 6/1976 | Ciciora |

*Primary Examiner*—Richard Murray
*Attorney, Agent, or Firm*—Hill, Van Santen, Steadman, Chiara & Simpson

[57] ABSTRACT

A color television receiver has an automatic adjustment system. The receiver includes a digital control unit for controlling the vertical deflection and the horizontal deflection outputs. The digital control unit contains a line counter, a programmable read only memory and a logic circuit which controls the outputs of the receiver. A sensor system serves for the automatic adjustment, which sensor system is arranged in front of the picture tube and which transmits the rated magnitudes to the programmable read only memory by means of an adjustment computer.

13 Claims, 9 Drawing Figures

COLOR TELEVISION RECEIVER HAVING AN AUTOMATIC ADJUSTMENT SYSTEM AND A PROCESS FOR ADJUSTING THE RECEIVER

BACKGROUND OF THE INVENTION

1. Field of the Invention

The present invention relates to a color television receiver having an automatic adjustment system, and to a process for accomplishing the automatic adjustment.

2. Description of the Prior Art

In known color television receivers, the pulse stages for the screen correction, the horizontal deflection and the vertical deflection are controlled on an analog basis. These control stages are partially integrated and partially equipped with discrete modules.

In order to control the horizontal deflection output stage, an oscillator generates horizontal frequency oscillations. These are compared with the line sync pulse on the transmission side and the line return pulse on the receiver side in phase monitoring circuits (for example, phase-locked loop). The regulating voltages generated upon phase differences serve for the synchronization of the oscillator (VCO). In general, phase relation and base frequency of the oscillator are provided as adjustment positions.

In order to control the vertical deflection output stage, a sawtooth generator (for example, blocking oscillator circuit) is directly synchronized by means of the vertical sync pulse and drives the vertical deflection output stage by way of a driver circuit. The current reduction caused by the heating of the deflection coil is compensated by way of a countercoupling. Here, generally, frequency, picture height and linearity are the adjustment magnitudes.

On the picture screen, the deflection midpoint of the electron beams does not coincide with the curvature midpoint of the screen. Therefore, a square picture on the screen is concavely distorted with its vertical lines in the shape of a pillow. The distortion of the horizontal lines in modern inline color picture tubes is generally already compensated by means of the deflection field. For correction of the so-called east/west pillow distortion, for example, a known diode modulator circuit is employed which modulates the voltage via the horizontal deflection coil in such a manner that the line deflection current is greater in the center of the picture than at the beginning of the picture and at the end of the picture and, viewed by way of image frequency, has a barrel-shaped course. Adjustment magnitudes of the diode modulator circuit are the modulation degree via image frequency, symmetry (so-called trapezoidal correction) and picture width.

In the analog signal stages for the video circuit and the PAL coder, for example, the magnitudes for the white value, the gray balance and the beam current limitation are adjusted.

In the positions for the magnitudes to be adjusted, which are mentioned above for the individual pulse or, respectively, signal stages, potentiometers are inserted which are adjusted by hand during or after the device assembly according to a visual evaluation of a test picture or according to the measurement of an electronic magnitude. These adjustments are therefore usually subjective and, moreover, cost intensive.

SUMMARY OF THE INVENTION

The object of the present invention is to provide a color television receiver having automatic adjustment and a process for accomplishing the automatic adjustment.

This object is achieved, according to the present invention, in that the color television receiver contains a digital control unit for the vertical deflection, the screen correction and the horizontal deflection output.

According to a particular feature of the invention, the digital control unit additionally contains an adjustment part for the analog signal stages.

The adjustment part for the analog stages contains intermediate memories, such as, for example, D flip-flops, CCD or shift registers, and digital/analog converters, for example, 2 R-R networks or R $2^n$ networks.

Advantageously, the digital control unit may consist of a line counter, a programmable read only memory and a logic circuit. The programmable memory may have $156 \times 8$ bit storage locations for the control of the pulse stages. In addition, the programmable read only memory may additionally contain storage locations for the digital adjustment of the analog stages.

Advantageously, the control unit may also contain a digital synchronous module having a controllable frequency divider for the control of the line output.

To further advantage, the digital control unit for controlling the vertical deflection output contains a memory, a multiplexer, two adders, two intermediate memories, two difference counters, a control bit preparation stage, a two's complement forming circuit, a data block, and a mean value forming circuit.

According to a particular feature of the invention, the mean value forming circuit contains a three-bit comparator, a three-bit latch, and a three-bit adder.

For controlling the horizontal deflection output, the digital control unit may advantageously contain a memory, a multiplexer, an adder, an intermediate memory, and a difference counter.

According to another feature of the invention, a sensor system scans a pattern generated on the picture screen by a pattern generator or, in the alternative, electrical magnitudes are determined in the circuit, the actual values are transmitted to an adjustment computer, the actual values are compared with weighted values, and altered until the actual and rated values coincide, the values thus obtained are intermediately stored in the adjustment computer and are subsequently transferred to the programmable read only memory of the digital control unit.

BRIEF DESCRIPTION OF THE DRAWINGS

Other objects, features and advantages of the invention, its organization, construction and mode of operation, will be best understood from the following detailed description, taken in conjunction with the accompanying drawings, on which.

DESCRIPTION OF THE PREFERRED EMBODIMENTS

Figure 1:
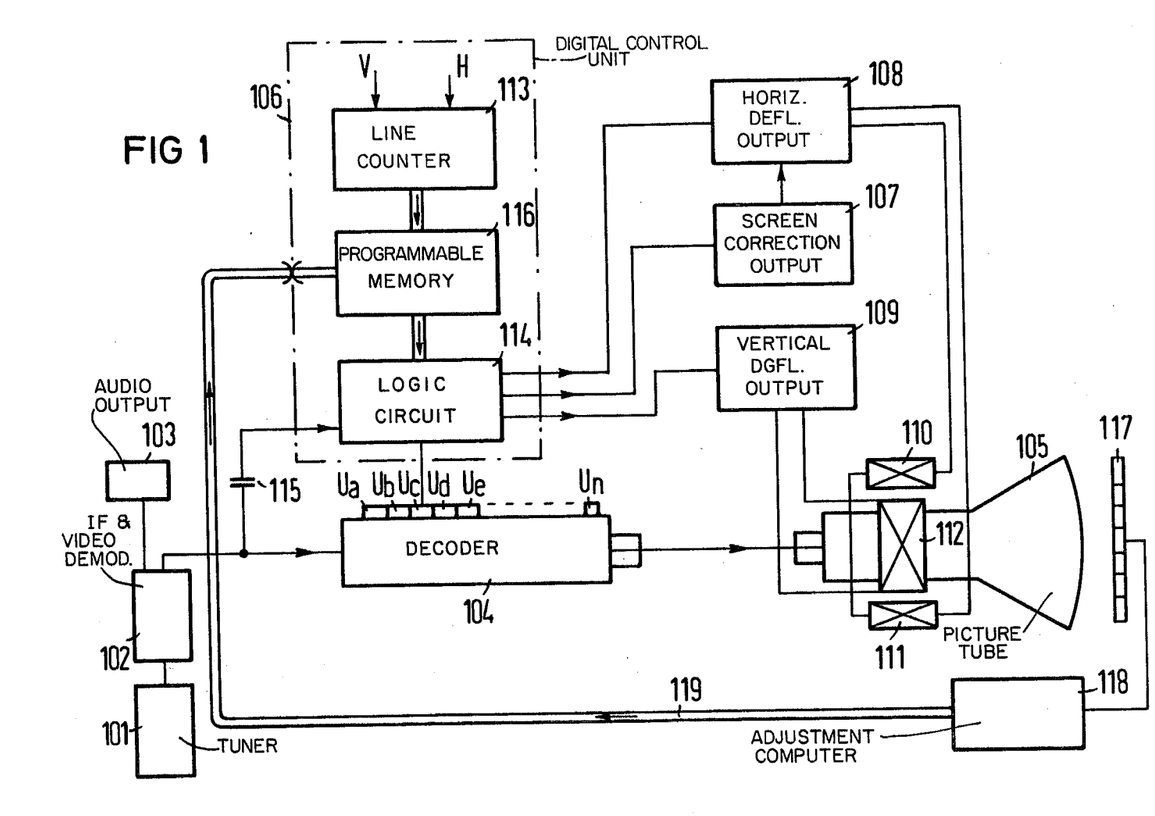
FIG. 1 is a block circuit diagram of a color television receiver constructed in accordance with the present invention.

Referring to FIG. 1, a block diagram of a color television receiver constructed in accordance with the present invention is illustrated in which a signal is received from the transmitter by way of a HF stage (tuner) 101, and is fed by way of an intermediate frequency stage and a video demodulator 102 to the video signal portion and the PAL decoder 104. From the PAL decoder 104 the signal is fed to a picture tube 105. Since the transmission from the transmitter to the receiver is accomplished in accordance with analog technology, the stages function in accordance with analog technology, inasmuch as a double conversion of the analog-type transmitted useful signals (the picture tube must be analog controlled) would involve a loss of quality and also does not seem meaningful from an economic standpoint.

The sound output 103 (the audio portion of the receiver) is derived from the intermediate frequency stage 102.

The color television receiver contains a digital control unit 106 which controls the screen correction output 107, as well as the horizontal deflection output stage 108 and the vertical deflection output stage 109.

The horizontal deflection output stage 108 controls a pair of coils 110 and 111, whereas the vertical deflection output stage 109 controls the corresponding coils for the vertical deflection operation, of which only one such coil 112 is illustrated in FIG. 1.

The digital control unit 106 contains a line counter 113 which is supplied with pulses of the vertical frequency V or, respectively, the horizontal frequency H. These pulses are delivered by a digital synchronous module, which is contained in the logic circuit 114. The logic circuit 114 receives a video signal from the video demodulator 102 via the coupling capacitor 115.

In addition to the synchronous module, the logic circuit 114 contains circuits for controlling the screen correction output stage 107, the horizontal deflection output stage 108 and the vertical deflection stage 109.

Further, there is contained in the digital control unit 106 a programmable memory 116 for constant values which is designated, for example, as a PROM, EPROM, EAROM or as a battery-buffered RAM, preferably having 156×8 bit memory locations.

The programmable memory for constant values 116 contains the information which are required for the operation of the digital control unit 106 in the color television receiver.

The digital control unit 106, furthermore, delivers adjustment voltages $U_a$, $U_b$, $U_c$, $U_d$, $U_e$–$U_n$, which, in the place of potentiometers, automatically adjust the magnitudes which are to be adjusted at the video signal portion and the PAL decoder 104, such as white level, gray balance, beam current limitation.

Further illustrated in FIG. 1 is a sensor system 117 which can be seen in front of the picture tube 105. The sensor system 117 serves for the automatic adjustment of the color television receiver by means of an adjustment computer 118 and an external data transmission line 119. In the adjustment computer 118, the above-mentioned magnitudes to be adjusted are compared with a rated value and intermediately stored. When the reference and actual values correspond, the memory 116 provided for constant values is programmed with the content of the computer intermediate memory.

Figure 2:
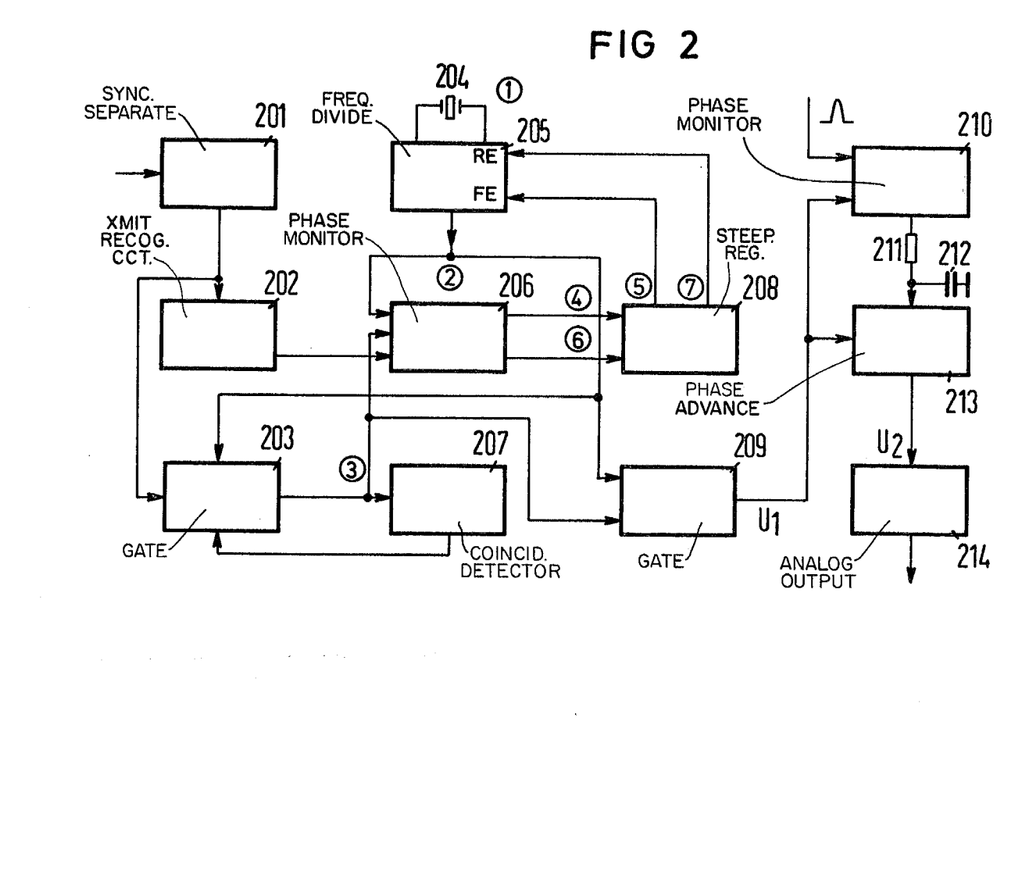
FIG. 2 is a basic circuit diagram of a digital synchronous module which may be employed in practicing the present invention.

In FIG. 2, a basic circuit diagram of the digital synchronous module controlling the line output is illustrated. The module contains a sync separator 201 which functions in an analog manner and receives a video signal from the video demodulator (not illustrated in FIG. 2). Further, a transmission recognition circuit 202 and a gate 203 are provided for interference blanking. The gate 203, which is constructed as a gate circuit, switches off when no synchronous pulse is received. Further, the digital synchronous module contains a crystal 204 which controls a controllable frequency divider 205. A phase monitor 206, a coincidence detector 207, a circuit for limiting the regulation steepness 208, and a further gate 209 (executed as a gate circuit) are also provided. An output pulse $U_1$ is received at the gate 209, which is subjected to a phase monitor 210 with the line return pulse of the line output. The regulation information is supplied by way of an integration element consisting of a resistor 211 and a capacitor 212 to an analog phase advancer 213, which supplies a pulse $U_2$ correspondingly delayed to the analog output stage 214 of the horizontal deflection output stage.

Figure 3:
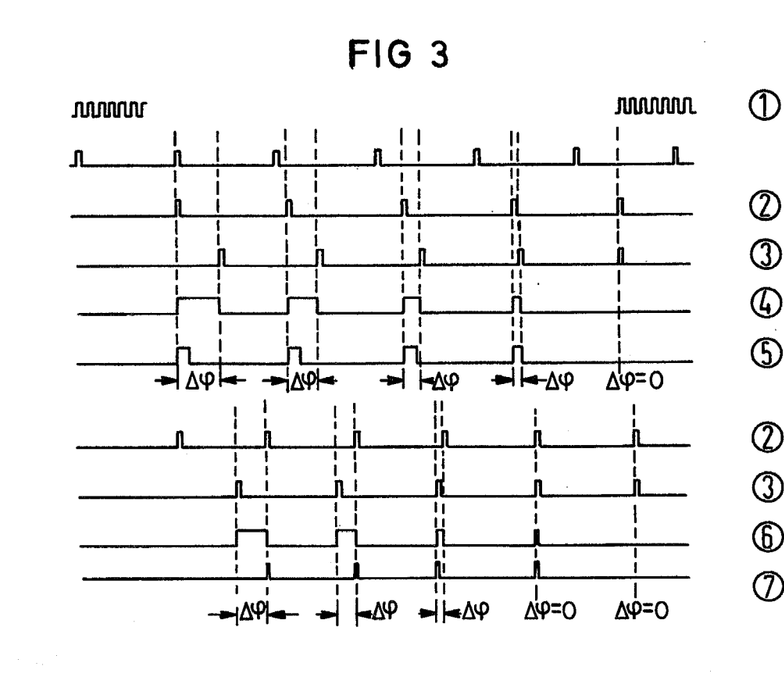
FIG. 3 is a schematic representation of the synchronization process.

The numerals 1–7 circled on the drawing refer to the synchronization process illustrated in FIG. 3 and are explained on the basis of this figure.

The digital synchronous module according to FIG. 2, functions according to the principle of a controllable frequency divider. By means of division in the frequency divider 205, a frequency which is identical as far as possible with the line rated frequency of 15,625 KHz is derived from a crystal stablized frequency clock 204 which need not amount to a whole multiple of the line frequency (for example, the double auxiliary color carrier frequency 8.86 MHz) in its freerunning non-synchronized state, i.e. when no synchronous pulse is received from the circuit. This frequency (namely, the one which is identical as far as possible with the line rated frequency) represents the horizontal free-running frequency of the synchronous module, and, therefore, of the attached line output. Because of its high stability, it can be directly employed as the reference frequency for the reproduction of information stored in an image storage device (for example, teletext or view data).

In the case of a received synchronous pulse, which is available at the output of the sync separator 201, a phase monitor 206 is activated by means of a transmission recognition circuit 202, which (phase monitor) effects synchronism between the synchronous pulse and the output pulse of the controllable frequency divider 205 after determining whether the initially perceived synchronous pulse falls in the first or second line half.

In case the initially perceived synchronous pulse is located in the first line half (out-running case), by means of a brief blocking via the relief-input FE of the divider 205 its final position is achieved later than in the free-running state. The decreasing temporal distance between the divider and the synchronous pulse achieved in this manner continues to affect the release of the divider 205 until a steady state is achieved.

In case the initially-perceived synchronous pulse is located in the second line half (running-behind case), the divider 205 is reset via the reset input RE before attaining the predetermined division ratio. This frequency increase again reduces the temporal distance between synchronous and division pulses until both leading edges are identical.

In principal, the synchronism could be achieved within a line period. Since, however, deviations greater than 10% from the reference frequency can destroy the semiconductor-equipped line output, the frequency alteration during the control process is limited to an allowable degree with the help of the gate circuit 208.

In the out-running case, in the steady state, a temporal deviation remains between the leading edge of the division pulse and the leading edge of the synchronous pulse, which is conditioned by means of the finite controlled-gain amplification. This deviation is eliminated in that, upon attainment of the steady state, the line output is directly triggered with the synchronous pulse. The steady state is then achieved when the leading edge of the synchronous pulse lies temporally within the gate 209 formed by the division pulse. Therefore, the division pulse only employed for triggering the line output in the free-running state and during the synchronization process. In the synchronized state, the division pulse has the function of a supplementary oscillator, which is available after a short temporal interval upon a sudden failure of the synchronous pulse (for example, when switching to a different program source). The freeing of this quasi-direct synchronization of noise pulse is secured to a high degree of digitally designed and thus temporally exactly defined gates 209, as well as 203 at the input of the phase monitor 206, for the synchronous pulse. Upon failure of the synchronization, a coincidence detector 207 takes care of intermediate suppression of the gate 203 in order to guarantee a quick recapture.

The transfer from the division pulse to the synchronous pulse in the steadiest state renders possible the employment of a division pulse frequency smaller than 10 MHz, since, thereby, the quantization error occurring in digital technology is avoided.

The output pulse $U_1$ of the previously-described system (division or synchronous pulse) is supplied to a digital phase discriminator 210 which ascertains the temporal interval between the line return pulse and the output pulse $U_1$ conditioned by means of the retardation of the line output. The regulating information integrated via the integration element 211, 212 effects the temporal coincidence of the two pulse in an analog operating phase advancer chain 213. It is necessary to utilize the analog phase advancer chain 213 in order to avoid the quantization error of the digital phase advance element.

The output pulse $U_2$ of the phase advance chain is standardized in a counter 214 to a pulse width dependent on the switching type of the line output and is supplied to the line output by way of an output amplifier.

The digital synchronous module according to the principal of a controllable frequency divider has a series of advantages in comparison to the traditional PAL circuits having VC oscillators. Because of the crystal stabilized division pulse frequency, the adjustment process of the free-running frequency is omitted, which in VC oscillators depends on the periphery. Further, because of the digitally-generated and, thus, temporally accurately defined gate circuits, a high degree of noise pulse freeing is possible. Further, the synchronous module makes possible a rapid synchronization without the high loss of noise pulse freeing provided in PAL circuits. The frequency alteration per line is only dependent on the permissible value for the line output.

FIG. 3, the synchronization process is schematically illustrated. In FIG. 3, at the top and referenced 1, a clock frequency of 8.86 MHz of the crystal 204 in FIG. 2 is illustrated. The controllable frequency divider 205, according to FIG. 2, delivers a division pulse every 64 $\mu$s. In FIG. 3, the second line from the top illustrates the free-running division pulse (without a synchronous pulse). The next four curves 2, 3, 4, 5 illustrate the synchronization process in the out-running case; whereas, the curves 2, 3, 6, 7 illustrate the synchronization process in the running-after case. Thereby $\Delta\phi$ indicates the phase difference division-pulse-synchronous-pulse in the out-running case or, respectively, synchronous-pulse-division-pulse in the running-after case.

Figure 4:
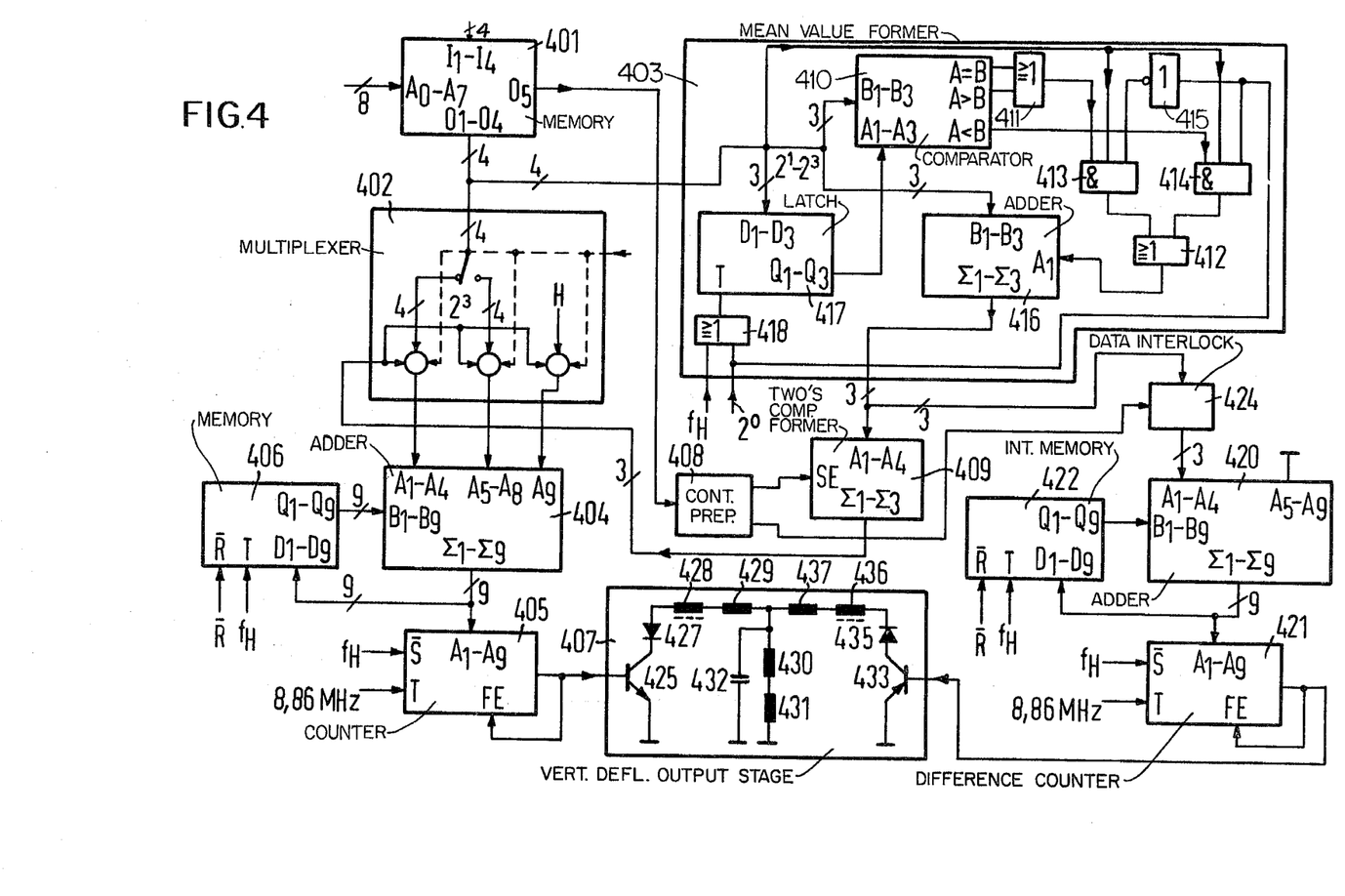
FIG. 4 is a basic circuit diagram of the logic circuit for controlling the vertical deflection output stage.

FIG. 4 illustrates a basic circuit diagram of the logic circuit controlling the vertical deflection output. A memory 401 having a 156×5 bit organization, which is a part of the programmable memory for constant values of the digital control unit according to FIG. 1, has eight outputs $A_0$–$A_7$ for the addressing of a line counter (not illustrated on the drawing) and four programming inputs $I_1$–$I_4$. Four outputs $O_1$–$O_4$ are connected, on the one hand, with a divider for the initial value formation (multiplexer 402) and, on the other hand, with a module for the mean value formation 403. The multiplexer 402 consists of gates which are respectively controlled by two RS flip-flops, whereby the control is address dependent.

Nine lines from the multiplexer 402 to the inputs $A_1$–$A_9$ of a nine-bit adder 404, which is formed by a series of gates. The adder 404 has nine outputs $\Sigma_1$–$\Sigma_9$ which, on the one hand, are connected to the inputs $A_1$–$A_9$ of a nine-bit difference counter 405, for example, formed by nine flip-flops, and, on the other hand, are connected to a nine-bit intermediate memory 406 (nine D flip-flops) having the inputs $D_1$–$D_9$. The nine-bit difference counter 405 moreover has inputs for the clock frequency T (8.86 MHz) and S for the horizontal frequency $f_H$. The output of the difference counter 405 is connected, on the one hand, to the vertical deflection output stage 407, and, on the other hand, to the release input FE. In addition to the inputs $D_1$–$D_9$, the intermediate memory 406 has inputs T for the horizontal frequency $f_H$ and for a reset pulse R.

An output $O_5$ is connected from the memory 401 to the control preparation stage 408 which consists of gates. The control bit preparation stage 408 controls a two's compliment former 409 whose three outputs $\Sigma_1$–$\Sigma_3$ are connected to the multiplexer 402. The module for the mean value formation 403 contains a three-bit comparator 410, which consists of gates and is connected with a three-bit adder 416 (formed of gates) by way of two OR elements 411, 412, two AND elements 413, 414, and an NAND element 415. Further, the mean value former 403 contains a three-bit latch 417 (three D flip-flops), which receives the horizontal frequency $f_H$ or, respectively, the address $2^0$ at the input T by way of an OR element 418. The three-bit latch 417 has inputs $D_1$–$D_3$ an outputs $Q_1$–$Q_3$. The three-bit comparator 410 has inputs $A_1$–$A_3$ from the three-bit latch 417 and inputs $B_1$–$B_3$ from the memory 401. Further, the three-bit comparator 410 has three outputs for $A=B$, $A>B$ and $A<B$. The three-bit adder 416 has three inputs $B_1$–$B_3$ from the memory 401 and an input $A_1$ from the three-bit comparator 410. Whereas the nine-bit adder 404, the nine-bit difference counter 405, and the nine-bit intermediate memory 406 control the upper picture half of the vertical deflection output stage 407, the lower picture half is controlled by the nine-bit adder 420, the nine-bit difference counter 421, and the nine-bit intermediate memory 422. A data interlock circuit 424 which is controlled by the control bit preparation circuit 408 is preconnected to the nine-adder 420.

The analog vertical deflection stage 407 comprises an NPN transistor 425 having a base which is controlled by the nine-bit difference counter 405. The emitter of the transistor 425 is grounded. The collector of the transistor 425 is connected with a pair of vertical deflection coils 430, 431 by way of a diode 427, a choke 428 and a winding (line transformer) 429. The other end of the deflection coil 431 is grounded. The end of the deflection coil 430 connected to the winding 429 is grounded by way of an integration capacitor 432.

The vertical deflection output stage 407 also includes a PNP transistor 433 whose base signal is derived from the output of the nine-bit difference counter 421. The emitter of the transistor 433 is grounded. The collector of the transistor 433 is connected to the vertical deflection coils 430, 431 by way of a diode 435, a choke 436 and a winding 437 (line transformer).

The upper half of the picture is controlled with the transistor 425 and the lower half of the picture is controlled with the transistor 433.

The vertical deflection output stage 407 functions in push-pull D operation and is supplied with the forward stroke voltage from the line output. Two line-frequency rectangular pulses having increasing or, respectively, decreasing pulse widths are required for the control of the vertical output. The increase or, respectively, decrease of the pulse width from line-to-line within a half picture is determined by the logic circuit illustrated in FIG. 4.

A ten-stage binary counter, which is constructed of ten flip-flops (not illustrated on the drawing) and which can be designed as an asynchronous or synchronous counter, is controlled at its pulse input with pulses of twice the line frequency. Eight-bit addresses can be tapped at the eight high-order positions of this counter, whereby an address corresponds to two lines of a half picture. These eight-bit addresses are applied to the address inputs $A_0$–$A_7$ of the memory 401. The memory, as previously described, can be provided as a PROM, EPROM, EAROM structure, or as a battery-buffered RAM construction.

In order to generate the aforementioned rectangular pulses in a digital/analog converter, a nine-bit word is required per line in the required resolution. In order to save memory locations, the nine-bit words per line are not stored, but rather the alteration of the words from address-to-address (an address corresponding to two lines of a half picture). Thereby, the memory space requirement is reduced from $312 \times 9$ bits to $156 \times 5$ bits. These five-bit words are edited in the logic circuit of FIG. 4 into the nine-bit words required for the digital-/analog converter. In order to form the rectangular pulse having increasing pulse width, a specific value from the memory is added to the preceding nine-bit word; for a rectangular pulse with decreasing pulse width, the specific value is correspondingly subtracted (greater pulse width corresponding to the higher value of the nine-bit word).

For rectangular pulses having decreasing pulse width, a so-called initial value must be formed at the initiation of a picture; the corresponding values read from the memory 401 are then subtracted from this value. This initial value is a nine-bit word and is likewise stored in the memory 401. The nine-bit word cannot be directly stored in the five-bit organized memory. Therefore, the ninth, highest value bit is firmly wired and the four higher-value bits are stored under the address zero and the four low-value bits are stored under the address one. These four-bit words are combined into the nine-bit initial value with the circuit described hereinbelow.

During the address zero, the outputs $O_1$–$O_4$ of the memory 401 are connected, via the multiplexer 402, to the inputs $A_5$–$A_8$ of the nine-bit full adder 404. The input $A_9$ of the adder 404 is connected as a logical "1". The remaining A inputs of the adder 404 are simultaneously connected as logical "0's". The inputs $B_1$–$B_9$ are connected to the outputs $Q_1$–$Q_9$ of the intermediate memory 406 (constructed as signal edge-controlled D-flip-flops).

At the beginning of the picture, the intermediate memory 406 is set to a logical "0" with an image frequency pulse. Therefore, during the address zero, logical "0" likewise is applied at B inputs of the adder 404. Therefore, the four-bit word pending at the inputs $A_5$–$A_8$ appears at the adding outputs $\Sigma_5$–$\Sigma_8$ and a logical "1" appears at the adder output $\Sigma_9$. The remaining $\Sigma$ outputs carry logical "0's".

The outputs $\Sigma_1$–$\Sigma_9$ are connected with the preselection inputs $A_1$–$A_9$ of the nine-stage binary synchronous counter 405. Moreover, the outputs of the adder 404 are connected with the data inputs $D_1$–$D_9$ of the intermediate memory 406.

About 2 μs after the data appears at the preselection inputs of the synchronous counter 405 and at the inputs of the intermediate memory 406, a pulse is applied to the input $\overline{S}$ of the synchronous counter 405 and at the clock input T of the intermediate memory 406 and the data are loaded into the intermediate memory 406 and into the synchronous counter 405. The output of the synchronous counter 405 is connected with its release input FE.

At the clock input of the counter 405, twice the auxiliary color carrier frequency (8.86 MHz) or another crystal-stabilized frequency of a similar periodic duration is applied.

Along with the pulse at the input S, the data of the preselection input are loaded and the counter 405 now begins to count proceeding from these data values. A counter pulse corresponds to about 100 ns. With the counter has reached the reading that its output is a logical "1" (corresponds to decimal 511), it is blocked by its release input FE. The time at which the counter reading 511 is reached is thereby directly dependent on the data value at the preselection input.

During the counting process, a logical "0" is applied to the output of the counter; from the end of the counting process up to the next pulse (in the succeeding line) a logical "1" is applied to the input $\overline{S}$. Therefore, a line frequency rectangular pulse arises at the output of the counter 405, whose pulse width is dependent on the data value of the preselection input. This rectangular pulse serves for controlling the vertical deflection output stage 407.

At the address one, the four low-value bits of the initial value are read from the memory 401. The multiplexer 402, in the meantime, has applied the memory outputs $O_1-O_4$ to the inputs $A_1-A_4$ of the adder 404. The data from the address one are thus applied to the adder inputs. The five higher-value bits of the initial value which are located in the intermediate memory 406 are applied to the adder inputs B in proper place order. The nine-bit initial value is now available at the output of the adder 404. At the control pulse, this value is again input into the synchronous counter 405 and into the intermediate memory 406. The working-off in the synchronous counter 405 occurs as has been described above with respect to the address zero and determines the rectangular pulse width for lines 3 and 4.

From address 2 up to address 155, the differential values are stored as four-bit words. The fifth bit is a control bit. These data must be edited before they are delivered to the adder stages. The four-bit word stored under each address must be distributed to the two lines appertaining to the respective address. This task is assumed by the mean value formation circuit 403. Therefore, the multiplexer 402 at the output of the memory 401 switches the memory outputs $O_1-O_4$ through to the inputs of the mean value formation circuit 403 from the address 2 through the address 155. The three higher-value bits arrive at the data inputs $D_1-D_3$ of the three-bit intermediate memory 417, to the inputs $B_1-B_3$ of a comparator 410 and to the inputs $B_1-B_3$ of a three-bit full adder 416. The data value divided by two (displacement by one position to the right) is available at the outputs $\Sigma_1-\Sigma_3$ of the adder 416. If the value $(O_1-O_4)$ pending at the mean value formation circuit input is an even number, then the value $(O_2-O_4)$ divided by two is directly available at the output, which value can be further processed for these two lines. If, on the other hand, the value pending $(O_1-O_4)$ is an odd number, a remainder (lowest-value place $O_1$ corresponds to a logical "1") arises upon the division, which remainder must be considered. The decision whether this remainder is to be added to the first line or the second line of the respective address is undertaken by the three-bit comparator 410. It compares the halved value of the preceding address (intermediately stored in the three-bit latch 417) with the halved value of the pending address. If the data value of the former address is greater than or equal to the latter, the remainder is added to the first line, otherwise it is added to the second line. The addition of the remainder takes place in the three-bit full adder 416.

The differential values of line-to-line are thus available at the output of the mean value formation circuit 403. In order to generate the rectangular pulses having decreasing pulse width (upper picture half, beginning from the upper picture edge), these differential values must be subtracted from the aforementioned initial value; for rectangular pulses having increasing pulse width must be added preceding from zero. For the addition (lower picture half beginning in the middle of the picture), the differential values can be delivered to the input of a nine-bit full adder 420 by way of a data block 424 and the rectangular pulses, as described above, can be generated with the synchronous counter 421.

For the subtraction, the two's complement (complement formation and logical "1" addition) must first be formed from the differential values and then be supplied to the inputs of the adder 404. The generation of the rectangular pulses in the synchronous counter 405 occurs as described above.

It is now desired to begin the addition not already at the beginning of the picture, or only at the middle of the picture, but rather in the course of the first half of the picture, and the subtraction is not to be stopped in the middle of the picture, but rather only in the course of the second half of the picture (overlapping). This is achieved with the control bit which is available for each address at the output $O_5$ of the memory 401. The data block 424 consisting of three AND elements each having two inputs, is arranged between the output of the mean value formation circuit 403 and the inputs of the nine-bit adder 420. The differential values are at respective inputs; the other three inputs are connected with the control bit line. An addition of the differential values in the first half of the picture can only take place when the control bit line carries a logical "1"; otherwise, a logical "0" (no addition) occurs at all outputs of the data block. The two's complement formation circuit 409 has outputs which are connected to the nine-bit adder 404 for the subtraction, and has a control input SE with which the output of the two's complement formation circuit can receive a logical "0". This control input is connected with the control bit line. Therefore, with the help of the control bit, the subtraction can be suppressed in the second half of the picture.

Figure 5:
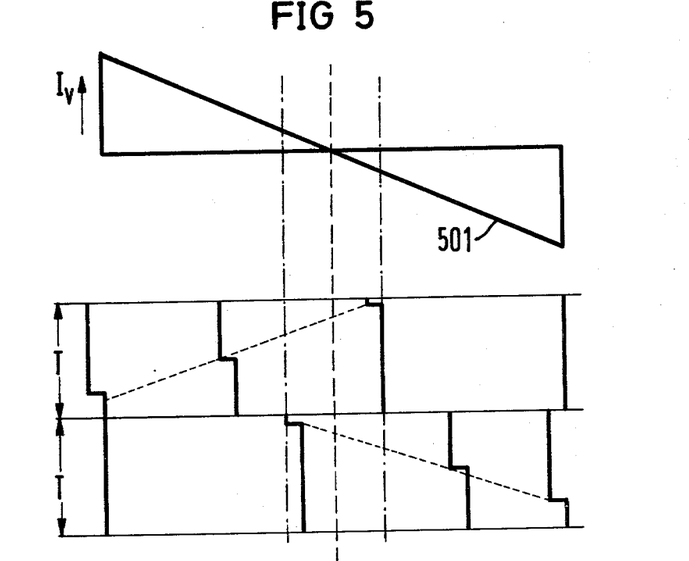
FIG. 5 illustrates the function of the vertical stage.

FIG. 5 illustrates the vertical deflection current $I_v$ as a function of the line. Thereby, for a curve 501, the left-hand picture edge corresponds to the first or, respectively, 313th line, and the right-hand picture edge corresponds to the 312th or, respectively, 625th line. In the second part of FIG. 5, the control pulses T for the NPN stage of the vertical deflection output stage 407 (first half of the picture, lines 1–312) and, in the lowest part of FIG. 5, the control pulses T for the PNP portion of the vertical deflection output stage 407 (second half of the picture, lines 313–625) are further illustrated. In addition, the range of overlapping in the central portion of the picture is illustrated in FIG. 5.

In order to obtain an output that does not function in a push-pull manner, or does not require a current overlapping in the central portion of the picture for other reasons, the data values to be subtracted from the initial value can already be stored as two's complements so that, in this case, the function for control bit preparation (408), for two's compliment formation (409), for nine-bit intermediate storage (422), for nine-bit difference counting (421), for nine-bit adding (420) and for data blocking (424) can be eliminated.

Figure 6:
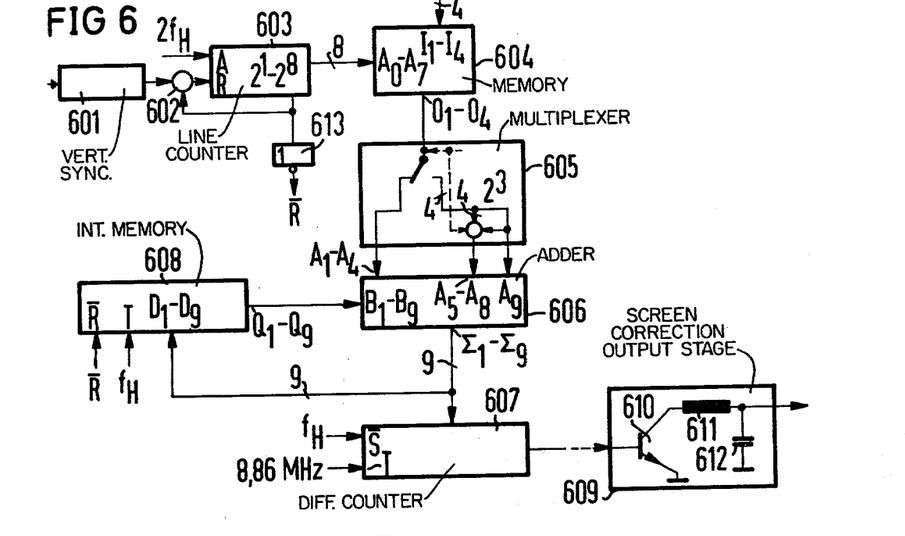
FIG. 6 is a basic circuit diagram of a logic stage for the control of the screen correction output stage.

FIG. 6 illustrates a basic circuit diagram of the logic stage for the control of the screen correction output. A vertical synchronous pulse is applied to a line counter 603 by way of a vertical pulse preparation circuit by way of an OR element 602. The nine-bit line counter 603 comprises, for example, nine flip-flops and has a reset input R and a counting input A for the frequency $2f_H$. The eight outputs of the line counter 603 are connected with eight inputs $A_0-A_7$ of a memory 604. The memory 604 is designed as a 156×4 bit memory and can be combined with the memory 401 of FIG. 4 to form the constant value programmable memory 116 of FIG. 1.

Further, the logic circuit for controlling the screen direction output, in a similar manner as the logic circuit for controlling the vertical deflection output stage (FIG. 4) includes a multiplexer 605, an adder 606, a difference counter 607 and an intermediate memory

608. The pulses for the screen correction output stage 609 are fed from the difference counter 607. The screen correction output stage 609 comprises a NPN transistor 610 having a base which is controlled by the counter 607 and an emitter which is grounded. The collector of the transistor 610 is grounded by way of a winding 611 and a capacitor 612; on the other hand, the connection to the horizontal deflection output stage extends from the collector by way of the winding 611. A NAND element 613 delivers a reset pulse $\overline{R}$.

Figure 7:
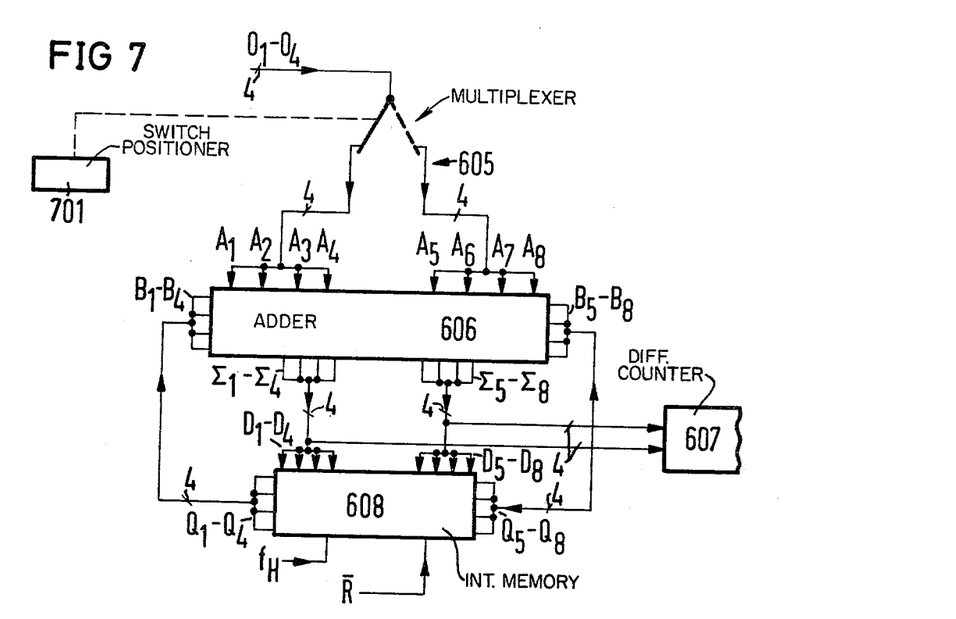
FIG. 7 is a representation of the initial value formation of the logic circuit illustrated in FIG. 6.

In FIG. 7, an enlarged partial section of FIG. 6 is shown illustrating the initial value formation. In the multiplexer 605, the switch position for line 1 is illustrated by a broken line and the switch position for all other lines is illustrated with a continuous line. The switch position, thereby, is occasioned by the switch positioner 701. Further, the adder stage 606, the nine-bit intermediate memory 608 and a portion of the difference counter 607 are illustrated in FIG. 7.

The circuit illustrated in FIG. 6 serves for removing the east/west screen distortion which has a concave-parabolic shape, usually with an error maximum in the horizontal picture center line. To that end, the length of the individual lines must be variable as a function of their momentary vertical excursion. The illustrated circuit controls, for example, a diode modulator output for D-action, whose current flow is determined by the pulse width of the control signal.

The binary line pulse counter 603 which is constructed, for example, of nine flip-flops forms memory addresses for the individual lines. In the memory 604, a binary value is then loaded at each address, which value is typical for the appertaining line and which determines line length. These line length information now arrive line-for-line at the data inputs of the synchronous counter 607 to which, moreover, a clock frequency is supplied which is very much larger than the line frequency. At the beginning of the line, the counter 603 begins to count up from the data value input to a number determined by means of wiring. While the counter is counting, its output exhibits a logical "0", otherwise a logical "1". The binary data values of the memory 604 are therefore converted into pulse widths with which the output can be controlled.

It now happens that an addressing of four respective lines (i.e. every second line of a half picture) yields a sufficient correction resolution. The memory, therefore, need only have 156 instead of 312 addresses. In order to obtain a uniform memory organization, only 156 addresses are also formed for the vertical deflection, as described above. The missing intermediate values for the non-programmed lines are then derived with the help of interpolation logic, that is with the mean value formation circuit 403 discussed above with respect to FIG. 4.

Therefore, the address counter 603 and the memory 604 can be identical for the screen correction operation and for the vertical deflection operation.

The full line length is laid down in a nine-bit word. Since only a relatively small portion must be variable for screen correction-modulation and picture width adjustment, and the rest remains constant, it is advantageous to store the constant value only once at the beginning of the vertical deflection period and to determine only the difference to the preceding addresses in the following addresses.

This constant initial value is defined with an eight-bit expression whose higher-value four bits are deposited at the address zero and the rest in the address one. Under the following addresses, only the difference between the current and the preceding addresses is respectively stored.

In order to generate the initial value, upon the address zero, the data outputs $O_1$–$O_4$ (higher-value) are applied to the A inputs $A_5$–$A_8$ of the adder 606 by way of a switch of the multiplexer 605. Since no information exists at the B inputs of the adder 606, the word $O_1$–$O_4$ of the address zero appears at the $\Sigma$ outputs $\Sigma_5$–$\Sigma_8$. All outputs of the adder 606 are connected with both the data inputs of the synchronous counter 607 and the D inputs of the intermediate memory 608. The outputs of the intermediate memory 608 accept the information input with a clock pulse which always occurs at the beginning of a line.

The outputs of the intermediate memory 608 are fed to the B inputs of the adder stage 606 (A+B=$\Sigma$).

In order to avoid a doubling of the initial value over the circuit adder 606-intermediate memory 608-adder 606, the clock pulse of the intermediate memory 608 is suppressed for lying 2 and the switch of the multiplexer 605 is transferred before the beginning of line 2 (still address zero). The four higher-value bits now reside at the four "lower-value" adder inputs $A_1$–$A_4$. For example, line 1 is formed from the four higher-value bits of the address zero and line 2 is formed from the sum of the four higher-value bits at the adder inputs $A_1$–$A_4$ and $B_5$–$B_8$ because, previously, the clock pulse for line 1 had applied the adder output $\Sigma_5$–$\Sigma_8$ to the B inputs $B_5$–$B_8$ of the adder 606 by way of the intermediate memory 608.

For the address one, the adder inputs $A_4$–$A_8$ are connected to logical "0", and the inputs $B_4$–$B_8$ are connected to $O_1$–$O_4$ of the address zero. The four low-value bits of the initial value are pending at the inputs $A_1$–$A_4$, so that the sum of $(O_1-O_4)_{ADR1}$ plus $(O_1-O_4)_{Adr0}$, which corresponds to the initial value, arrives at the difference counter. The double of the four low-value bits by way of the circuit is avoided by means of a suppression of the clock pulse in line 4.

The following addresses now only deliver the differences to their pre-addresses at the A inputs, the content of the pre-addresses simultaneously residing at the B inputs of the adder 606 via the intermediate memory 608. Therefore, it is true that $$\Sigma_m = D_m + \Sigma_{m-1},$$

$$m = 2, 3, 4 \ldots 155$$

whereby the content $D_m$ always stands for two neighboring lines in the half of the picture.

For the extreme values of the error amplitude (normally only one in the picture center), the correction values change their operational sign. The memory already contains the two's complement of the correction value for the subtraction phases.

In the addition of the two's complements, the free locations of the nine-bit word of which only the variable portion is delivered per address, must be filled with one. Therefore, the information at the memory output $O_4$ during the subtraction phase has the value "1" (otherwise "0") and is applied by the switch of the multiplexer 605 (except during the initial value formation) to the adder inputs $A_5$–$A_9$.

At the end of each vertical deflection period, the D flip-flops of the intermediate memory 608 are reset through the application of the signal $\overline{R}$.

The nine-bit difference counter 607, as in the control circuit for the vertical deflection, counts from the value existing at its data inputs up to 511 with a clock pulse of 8.86 MHz and is then arrested. At the beginning of each line period, the nine-bit difference counter 607 accepts new data from the adder 606. During counting of the counter 607, its output exhibits "0" and otherwise, up to the end of the period, the output exhibits a "1".

Therefore, a pulse series arises having variable scanning ratios which are dependent on the correction data for the control of the current flow in the analog functioning output.

Figure 8:
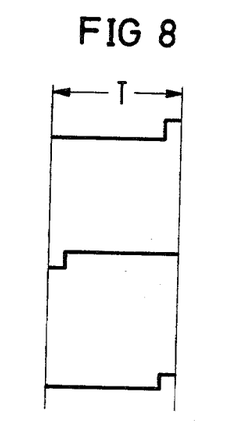
FIG. 8 illustrates the function of the east/west correction.

In FIG. 8, the function of the east/west correction for the line period T is illustrated. At the top of the figure and the bottom thereof, the counting is carried out with small data values; whereas, in the central part of the figure, the data value is large.

Figure 9:
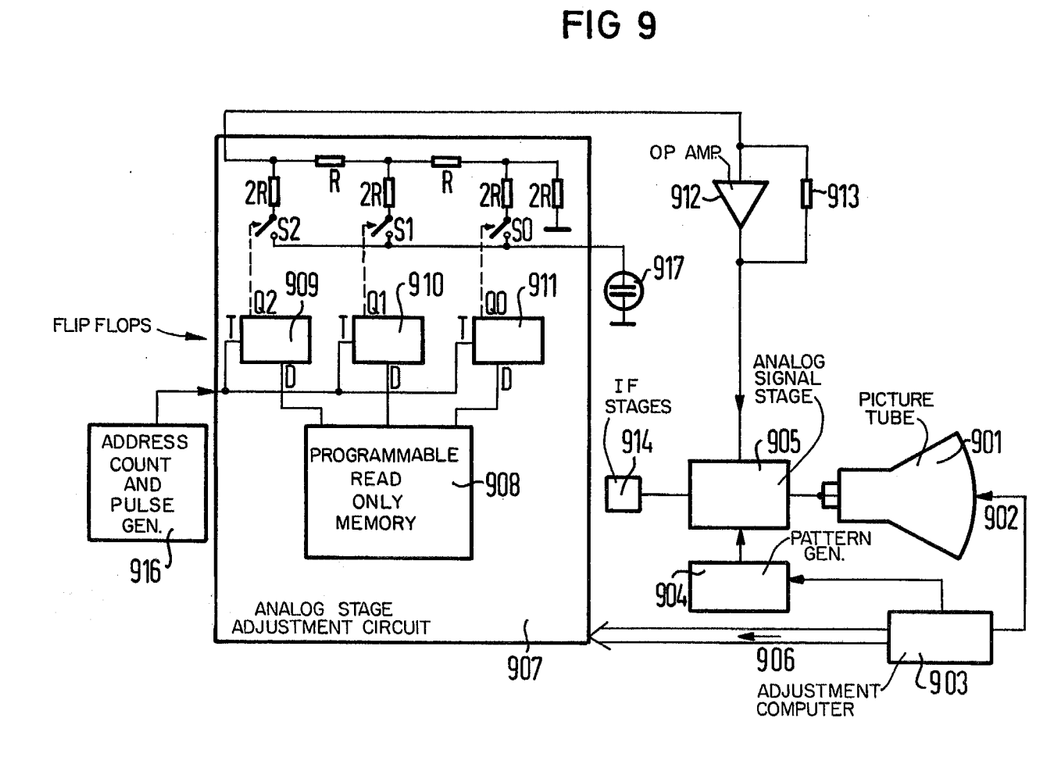
FIG. 9 is a basic circuit diagram illustrating automatic adjustment for a color television receiver according to the present invention.

Referring now to FIG. 9, a basic circuit diagram for the automatic adjustment for the analog signal stage of a color television set having a digital control unit is illustrated. The picture tube 901 is scanned with a sensor system 902 which is connected to an adjustment computer 903. The adjustment computer 903 is connected with a pattern generator 904 which, in turn, is connected with the analog signal stage 905. On the other hand, the adjustment computer 903 is connected by way of a data transmission line 906 with a circuit 907 in the digital control unit which serves for the adjustment of the analog stages. In the adjustment portion 907, the programmable read only memory 908 is illustrated, the same being connected by way of D flip-flops 909, 910 with so-called 2 R-R resistor networks which function as regulating units in order to convert the binary data values into current magnitudes. These current magnitudes are then supplied as an adjustment voltage to the analog signal stage 905 by way of an operational amplifier 912 to which a resistor 913 is connected in parallel. The anlog signal stage 905 is controlled by the high frequency (HF) or intermediate frequency (IF) stages 914.

In addition, an address counter and pulse generator are illustrated in FIG. 9 which are required for the turn-on or return phase.

The adjustment portion 907 is supplied with a reference voltage from a constant voltage source.

During the adjustment process, the sensor system 902 seizes the actual values on the basis of the pattern illustrated on the picture screen 901 by the pattern generator 904, or by means of the measurement of electric magnitudes in the circuit and forwards the same to the adjustment computer 903. These actual values are then altered by the computer 903 and an internal control unit until they have attained their rated values. These are then intermediately stored in the memory (RAM) of the adjustment memory and are later transmitted into the read only memory 908.

Thereby the comparison magnitudes can be stored in the adjustment computer 903, or can be provided by means of the position of the sensors in front of the picture screen.

ADJUSTMENT OF THE WHITE LEVEL

When the viewer of a color television picture is to be given the impression of white, the intensities of the three primary colors (red, green and blue) must stand in a very specific relationship to one another (for example, 0.3 R + 0.95 G + 0.11 B). This relationship is adjusted by way of the amplification of the three color outputs which control the picture tube electrodes. These known rated values are permanently stored in the adjustment computer 903 and are compared with the actual values delivered by the sensor system 902.

The adjustment computer 903 now alters the amplification of the color stages by way of the external data transmission line 906 and the adjustment portion 907 until such time as the reference/actual difference has become zero.

The sensor system 902 is arranged in front of the picture screen and can comprise, for example, three photo diodes of which each, by way of a filter arrangement, respectively receives only the light of one of the three color types, that is one receives red, one receives blue and one receives green.

The final values are first held as binary values in the transient or intermediate memory (RAM) of the adjustment computer 903 and, after termination of the adjustment process, are transmitted into the read-only memory 908, which delivers the operational data in place of the adjustment computer during the use of the color television receiver.

The data control introduced by the digital adjustment elements in place of the usual potentiometer structure must always be available when the device is turned on.

Therefore, for example, each time the color television receiver is turned on, a counter circuit can call up the respective addresses of the read only memory 908 and therefore deliver its content to intermediate memories (for example, D-flip-flops, shift registers, electrostatic memories, so-called CCD), at whose output they exist during the entire on time.

Furthermore, there exists the possibility of periodically repeating the interrogation of the addresses during the non-visible return phase of the electron beam.

According to FIG. 9, the so-called 2 R-R resistor network or R $2^n$ resistor network is used as a regulating unit which converts the binary data values into current magnitudes.

In the same manner, further positions of the analog signal stages, for example, such as gray balance, beam current limitations and picture tube operating point, can be adjusted. Independent of the word width of the memory 908, the data can be supplied to as many intermediate memories as desired upon reading by means of multiplexers.

The adjustment of positions which, as experience has shown, must be reset in the course of the life span of a device can occur in such a manner that the potentiometers are retained, but are adjusted by means of a motor-driven adjusting mechanism whose drive is controlled by the sensor by way of the adjustment computer.

The memory 908 is advantageously constructed in such a manner that it exhibits the required storage locations, both for the digital pulse stages as well as for the analog signal stages. For example, for ten adjustment positions of the analog signal stages with a total of 64 bits, the memory is enlarged from 156×8 bits to 164×8 bits.

ADJUSTMENT OF THE EAST/WEST SCREEN CORRECTION AND THE VERTICAL DEFLECTION

An east/west screen correction circuit has the task of straightening the vertical screen lines that are curved to the inside in a pillow-like manner because of the picture tube geometry. To this end, the line deflection currents must be increased toward the center of the picture.

The deflection angle is proportional to the deflection current and is determined by the magnitude of the binary number stored in the read only memory 908 under the address concerned.

In the automatic adjustment process, a vertical bright line is generated on the picture tube 901 by the pattern generator 904. Its distance from the picture screen center is a measure for the line length. Serving as the sensor system 902 is, for example, a photo diode which can be moved from top to bottom by means of a motor on a track at (for example, the left hand) picture edge with a fixed speed. Since only every second line of a half picture, i.e. each fourth line of a full picture, have address and data allocated thereto, the speed of the moving sensor system 902 must be such that, at each picture slip of the electron beam it is still located in the line group to be addressed. As an alternative to the moving photo diode, a sensor system 902 could also be attached consisting of a strip having a plurality of diodes corresponding to the 156 addresses. The directional sensitivity and response sensitivity of the photo diodes serving as sensors can improve with optical means, such as, for example, lenses and screens (apertures).

At the beginning of the adjustment process, the adjustment computer 908 increases the data value of the first line (whereby this widens correspondingly) until the aforementioned pattern reaches the sensor location and thus triggers an information to the computer 903. The first line now has the desired length and its data value is, because of the sensor report, no longer increased, but rather is intermediately stored as an eight-bit initial value under the addresses zero and one in the RAM memory of the computer 903. This process is not repeated for each fourth line, whereby only the data alteration compared with the preceding address is retained, i.e. the difference is $\Delta D_n = D_n - D_{n-4}$ are stored for the lines, whereby $D_0$ corresponds by definition to the initial value and n=4, 8, 12 . . . .

The maximum correction value normally coincides with the horizontal center line of the picture screen. The subsequent D values are therefore negative and are stored in the adjustment computer as two's compliments, so that a subtraction follows during the latter processing in the adder stages of the digital control system.

The addressing of the intermediate memory and the deflection of the electron beam of the picture tube 901 are synchronized by the pattern generator 904. After completion of the adjustment of the device, the intermediate memory content is transferred into the read only memory 908 of the digital control unit which delivers the operational data for the color television receiver.

This process has the advantage that it delivers an accurate correction independently of the characteristics of the regulating units or picture tubes and deflection systems.

The adjustment process for the vertical control stages follows in a similar manner.

In order at first to be able to generate a pattern at all, it is advantageous to have an imperical program in the read only memory of the adjustment computer 903. The process described above—employment of a photo diode which, for example, is moved in a step-wise manner from top to bottom in front of the picture screen with a stepping motor, or the employment of a strip diodes— then writes accurate data into the RAM memory of the adjustment computer 903. Here, too, an initial value is first formed. For each further four lines, then, likewise, only the difference with respect to the preceding address is determined and stored.

In the upper half of the picture, the data values decrease toward the center of the picture, i.e. the $\Delta D$ values are negative. Between the center of the picture and the lower edge of the picture, the $\Delta D$ values are positive. By means of an additional control bit, which is contained in each data value, the current of the picture center (overlapping) in the output circuit is determined in the digital control unit.

The digital control unit constructed in accordance with the present invention comprises, for example, a rapid logic circuit up to about 9 MHz (for example, $I^2L$ circuits), a slow logic circuit (for example, MOS technology), and the programmable read only memory having $156 \times 8$ bits. The full automatic adjustment process described can occur in a $\mu C$ manner of regulation.

Although we have described out invention by reference to particular illustrative embodiments thereof, many changes and modifications of the invention may occur to those skilled in the art without departing from the spirit and scope of the invention. We therefore intend to include within the patent warranted hereon all such changes and modifications as may reasonably and properly be included within the scope of our contribution to the art.

We claim:

1. A color television receiver comprising:
receiving means for receiving television signals and providing video signals;
a picture tube including a picture screen;
analog control stages coupled to said picture tube for controlling horizontal and vertical deflection and screen correction; and
a digital control unit connected to said receiving means and to said analog control stages for controlling the operation of said control stages in accordance with the received video signal, said digital control unit including
a line counter for counting vertical and horizontal lines,
a programmable read only memory for storing reference values, and
logic means connected to said line counter and to said programmable read only memory, said logic means coupled to receive the video signals and connected to and operable to control said analog control stages in response to the video signals and the reference value stored in said memory.

2. The receiver of claim 2, wherein said digital control unit comprises:
intermediate memories; and
digital/analog converters connected to control said analog control stages.

3. The receiver of claim 2, wherein said intermediate memories comprise flip-flops.

4. The receiver of claim 2, wherein said intermediate memories comprise charge coupled devices.

5. The receiver of claim 2, wherein said intermediate memories comprise shift registers.

6. The receiver of claim 2, wherein said digital-/analog converters comprise 2 R—R networks.

7. The receiver of claim 2, wherein said digital-/analog converter comprise R $2^n$ networks.

8. The receiver of claim 1, wherein said programmable memory is constructed as a $156 \times 8$ bit memory organization.

9. A color television receiver comprising:

receiving means for receiving television signals and providing video signals;

a picture tube including a picture screen;

analog control stages coupled to said picture tube for controlling horizontal and vertical deflection and screen correction; and a digital control unit connected to said receiving means and to said analog control stages for controlling the operation of said control stages in accordance with the received video signals, said digital control unit including a line counter for counting vertical and horizontal lines, a programmable memory for storing reference values, and logic means connected to said line counter and to said programmable memory, said logic means coupled to receive the video signals and connected to and operable to control said analog control stages in response to the video signals and the reference values stored in said memory.

10. A color television receiver comprising:

receiving means for receiving television signals and providing video signals;

a picture tube including a picture screen;

analog control stages coupled to said picture tube for controlling horizontal and vertical deflection and screen correction; and a digital control unit connected to said receiving means and to said analog control stages for controlling the operation of said control stages in accordance with the received video signals, said digital control unit comprising a digital synchronous module including a controllable frequency divider for controlling line frequency.

11. A color television receiver comprising:

receiving means for receiving television signals and providing video signals;

a picture tube including a picture screen;

analog control stages coupled to said picture tube for controlling horizontal and vertical deflection and screen correction; and a digital control unit connected to said receiving means and to said analog control stages for controlling the operation of said control stages in accordance with the received video signals, said digital control unit including, for the control of vertical deflection, a line counter, address input connected to said line counter, and outputs, a multiplexer connected to some of said memory outputs a control bit preparation stage connected to one of said memory outputs, a control bit preparation stage connected to one of said memory outputs, a two's compliment former connected to said control bit preparation circuit, a data block connected to said control bit preparation circuit, a pair of adders, one of said adders connected to said multiplexer, a mean value formation circuit connected to said some outputs of said memory and connected to said two's compliment former, and a pair of difference counters, each of said difference counters connected between respective ones of said adders and said analog control circuit which controls vertical deflection.

12. The receiver of claim 11, wherein said mean value formation circuit comprises:

a three-bit comparator;

a three-bit latch, said latch and said comparator connected to receive the output data from said memory;

a three-bit adder also connected to receive the output data from said memory and connected to said two's compliment former; and logic circuits connecting said comparator to said adder for controlling overlap in the central portion of said picture screen.

13. A color television receiver comprising:

receiving means for receiving television signals and providing video signals;

a picture tube including a picture screen;

analog control stages coupled to said picture tube for controlling horizontal and vertical deflection and screen correction; and a digital control unit connected to said receiving means and to said analog control stages for controlling the operation of said control stages in accordance with the received video signals, said digital control unit including, for control of horizontal deflection, a line counter, a programmable memory including programming inputs, address input connected to said line counter and outputs, a multiplexer connected to said outputs of said memory, an adder including first inputs connected to said multiplexer, second inputs and outputs, an intermediate memory connected between said outputs of said adder and said inputs of said adder, and a difference counter including an input for receiving a reference frequency, an input for receiving the horizontal frequency and inputs connected to said outputs of said adder, said difference counter also including an output for connection to said analog control circuit which controls horizontal deflection.

* * * * *